United States Patent
Li et al.

(10) Patent No.: US 10,165,586 B2
(45) Date of Patent: Dec. 25, 2018

(54) METHOD AND DEVICE FOR DETERMINING REMOTE RADIO UNIT

(71) Applicant: Huawei Technologies Co., Ltd., Shenzhen, Guangdong (CN)

(72) Inventors: Li Li, Shenzhen (CN); Quanzhong Gao, Shenzhen (CN); Chaoyi Yan, Shenzhen (CN); Hui Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 15/391,024

(22) Filed: Dec. 27, 2016

(65) Prior Publication Data

US 2017/0111920 A1 Apr. 20, 2017

Related U.S. Application Data

(63) Continuation of application No. PCT/CN2015/078749, filed on May 12, 2015.

(30) Foreign Application Priority Data

Jun. 30, 2014 (CN) .......................... 2014 1 0306364

(51) Int. Cl.
*H04W 72/12* (2009.01)
*H04B 17/345* (2015.01)
(Continued)

(52) U.S. Cl.
CPC ...... *H04W 72/1231* (2013.01); *H04B 17/345* (2015.01); *H04L 5/0035* (2013.01);
(Continued)

(58) Field of Classification Search
None
See application file for complete search history.

(56) References Cited

U.S. PATENT DOCUMENTS

| 2012/0135771 | A1 | 5/2012 | Futaki |
| 2012/0224541 | A1 | 9/2012 | Yoshiuchi et al. |

(Continued)

FOREIGN PATENT DOCUMENTS

| CN | 101854643 A | 10/2010 |
| CN | 101877687 A | 11/2010 |

(Continued)

*Primary Examiner* — Christine T Duong (57) ABSTRACT

Embodiments of the present invention relate to a method and device for determining RRU. The method includes: a BBU obtains interference strength information of a terminal, where the interference strength information includes a downlink mode of the terminal. The method further includes: if demodulation is performed by using a dedicated reference signal (DRS) in the downlink mode, the BBU performs resource scheduling on the terminal by using a second RRU, where the second RRU is selected by the BBU from multiple first RRUs that serve the terminal; or if demodulation is performed without using a DRS in the downlink mode, the BBU performs resource scheduling on the terminal by using a third RRU, where the third RRU is determined by the BBU according to any one of an uplink signal strength value of the terminal, a downlink quality value of the terminal, or an uplink quality value of the terminal.

14 Claims, 3 Drawing Sheets

(51) Int. Cl.
*H04L 5/00* (2006.01)
*H04W 88/08* (2009.01)

(52) U.S. Cl.
CPC ............ *H04W 72/12* (2013.01); *H04L 5/006* (2013.01); *H04L 5/0023* (2013.01); *H04L 5/0069* (2013.01); *H04W 88/085* (2013.01)

(56) References Cited

U.S. PATENT DOCUMENTS

| | | | |
|---|---|---|---|
| 2013/0315192 A1 | 11/2013 | Seo | |
| 2014/0036822 A1* | 2/2014 | Maeda | H04W 72/04 370/329 |
| 2016/0242147 A1* | 8/2016 | Tarlazzi | H04W 72/042 |

FOREIGN PATENT DOCUMENTS

| | | | |
|---|---|---|---|
| CN | 102239649 A | 11/2011 | |
| CN | 103220684 A | 7/2013 | |
| CN | 103516637 A | 1/2014 | |
| CN | 104066196 A | 9/2014 | |
| EP | 2858265 A1 | 4/2015 | |
| JP | 2012182792 A | 9/2012 | |
| JP | 2014512745 A | 5/2014 | |
| KR | 20120048605 A | 5/2012 | |
| WO | 2009036636 A1 | 3/2009 | |
| WO | 2011016560 A1 | 2/2011 | |
| WO | 2013082734 A1 | 6/2013 | |
| WO | 2013183943 A1 | 12/2013 | |
| WO | 2014086027 A1 | 6/2014 | |

* cited by examiner

METHOD AND DEVICE FOR DETERMINING REMOTE RADIO UNIT

CROSS-REFERENCE TO RELATED APPLICATIONS

This application is a continuation of International Application No. PCT/CN2015/078749, filed on May 12, 2015, which claims priority to Chinese Patent Application No. 201410306364.2, filed on Jun. 30, 2014, the disclosures of the aforementioned applications are hereby incorporated by reference in their entireties.

TECHNICAL FIELD

The present invention relates to the communications field, and in particular, to a method and device for determining remote radio unit RRU.

BACKGROUND

Currently, because a single-frequency networking working manner is widely used in a Long Term Evolution (LTE) system, interference between cells is extremely severe. Especially in a network with great base station density, interference is particularly apparent.

A multi-Remote Radio Unit (RRU) cell technology can be used to reduce interference during dense base station arrangement and obtain a combined gain. The multi-RRU cell technology is specifically a technology of combining multiple RRUs into one cell and performing joint transmission for all terminals.

Figure 1:
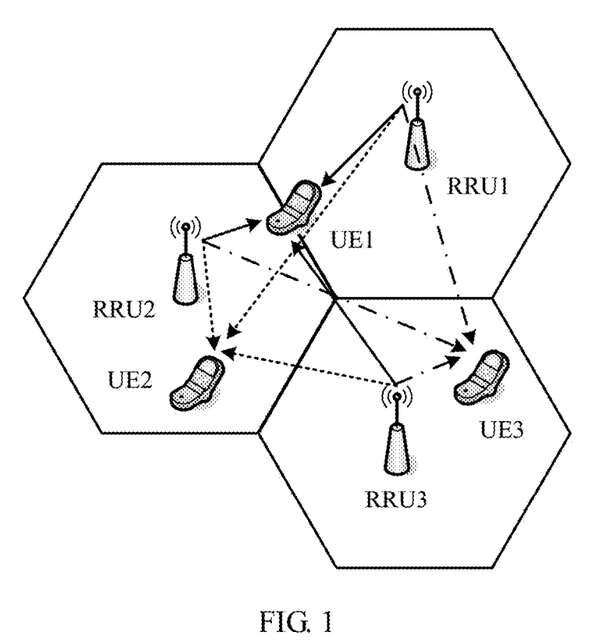
FIG. 1 is a schematic diagram of performing resource scheduling on a terminal by using a multi-RRU cell technology in the prior art.

In the prior art, abase station performs resource scheduling on a terminal by using the multi-RRU cell technology. A specific process is shown in FIG. 1. The base station combines multiple independent RRUs (such as RRU 1, RRU 2, and RRU 3) into one logical cell, and in the cell, physical cell identifiers (Physical Cell ID) of the multiple independent RRUs are the same. The base station schedules the multiple RRUs in the cell to a same time-frequency resource to simultaneously send same data for a terminal, so that signals in multiple cells that originally interfere with each other are changed into multipath signals enhanced by being overlaid, which improves a cell-edge Signal to Interference plus Noise Ratio (SINR), reduces a quantity of neighboring cells, and apparently reduces co-channel interference between cells. In this way, cell-edge service experience of a user is improved.

However, the following problem of a multi-RRU joint transmission manner used in the prior art is exposed: In the technology, the multi-RRU joint transmission manner is used when the base station performs resource scheduling on all terminals. However, because a resource is not reused among all RRUs, a system throughput loss is severe if service volumes of multiple users are sufficient.

SUMMARY

Embodiments of the present invention disclose a method and device for determining remote radio unit (RRU), so as to resolve a problem, caused by a multi-RRU joint transmission manner used in the prior art, that a system throughput loss is severe if service volumes of multiple users are sufficient.

According to a first aspect, an embodiment of the present invention provides a method for determining remote radio unit (RRU), where the method includes:

obtaining, by a baseband unit (BBU), interference strength information of a terminal, where the interference strength information includes a downlink mode of the terminal; and the method further includes:

if demodulation is performed by using a dedicated reference signal (DRS) in the downlink mode, performing, by the BBU, resource scheduling on the terminal by using a second RRU, where the second RRU is selected by the BBU from multiple first RRUs that serve the terminal; or if demodulation is performed without using a DRS in the downlink mode, performing, by the BBU, resource scheduling on the terminal by using a third RRU, where the third RRU is determined by the BBU according to any one of an uplink signal strength value of the terminal, a downlink quality value of the terminal, or an uplink quality value of the terminal.

In a first possible implementation manner, the multiple first RRUs include the second RRU and other RRU, and a signal strength value of the second RRU is greater than a signal strength value of the other RRU.

In a second possible implementation manner, if the uplink signal strength value is less than a first threshold, or the downlink quality value is less than a second threshold, or the uplink quality value is less than a third threshold, the third RRU includes all RRUs controlled by the BBU.

In a third possible implementation manner, if the uplink signal strength value is greater than or equal to a first threshold, or the downlink quality value is greater than or equal to a second threshold, or the uplink quality value is greater than or equal to a third threshold, the third RRU includes the multiple first RRUs that serve the terminal.

With reference to the second or the third possible implementation manner of the first aspect, in a fourth possible implementation manner, the method further includes:

determining, by the BBU, whether the uplink signal strength value is less than the first threshold; or determining, by the BBU, whether the downlink quality value is less than the second threshold; or determining, by the BBU, whether the uplink quality value is less than the third threshold.

With reference to any one of the first aspect or the first, the second, the third, or the fourth possible implementation manner of the first aspect, in a fifth possible implementation manner, the method further includes:

obtaining, by the BBU, location information of the terminal, and determining, according to the location information and the interference strength information of the terminal, the multiple first RRUs that serve the terminal.

According to a second aspect, an embodiment of the present invention provides a device for determining remote radio unit, including a first unit and a second unit, where:

the first unit is configured to obtain interference strength information of a terminal, where the interference strength information includes a downlink mode of the terminal; and the second unit is configured to: when demodulation is performed by using a dedicated reference signal (DRS) in the downlink mode, perform resource scheduling on the terminal by using a second RRU, where the second RRU is selected from multiple first RRUs that serve the terminal; or the second unit is configured to: when demodulation is performed without using a DRS in the downlink mode, perform resource scheduling on the terminal by using a third RRU, where the third RRU is determined according to any one of an uplink signal strength value of the terminal, a downlink quality value of the terminal, or an uplink quality value of the terminal.

In a first possible implementation manner, the multiple first RRUs include the second RRU and other RRU, and a signal strength value of the second RRU is greater than a signal strength value of the other RRU.

With reference to the first possible implementation manner of the second aspect, in a second possible implementation manner, the second unit is further configured to: determine a signal strength value of each first RRU of the multiple first RRUs, determine a maximum value in the signal strength values of the first RRUs, and determine a first RRU corresponding to the maximum value as the second RRU.

In a third possible implementation manner, if the uplink signal strength value is less than a first threshold, or the downlink quality value is less than a second threshold, or the uplink quality value is less than a third threshold, the third RRU includes all RRUs controlled by the device.

With reference to the third possible implementation manner of the second aspect, in a fourth possible implementation manner, if the uplink signal strength value is greater than or equal to a first threshold, or the downlink quality value is greater than or equal to a second threshold, or the uplink quality value is greater than or equal to a third threshold, the third RRU includes the multiple first RRUs that serve the terminal.

With reference to the third or the fourth possible implementation manner of the second aspect, in a fifth possible implementation manner, the second unit is further configured to:

determine whether the uplink signal strength value is less than the first threshold; or determine whether the downlink quality value is less than the second threshold; or determine whether the uplink quality value is less than the third threshold.

With reference to any one of the second aspect or the first, the second, the third, the fourth, or the fifth possible implementation manner of the second aspect, in a sixth possible implementation manner, the first unit is further configured to obtain location information of the terminal; and the second unit is further configured to determine, according to the location information and the interference strength information of the terminal, the multiple first RRUs that serve the terminal.

With reference to any one of the second aspect or the first, the second, the third, the fourth, the fifth, or the sixth possible implementation manner of the second aspect, in a seventh possible implementation manner, the device is a baseband unit (BBU) or a base station.

Therefore, by applying the method and device for determining remote radio unit (RRU) provided in the embodiments of the present invention, a BBU obtains interference strength information of a terminal. If demodulation is performed, by using a dedicated reference signal (DRS), in a downlink mode of the terminal included in the interference strength information, the BBU performs resource scheduling on the terminal by using a second RRU, where the second RRU is selected by the BBU from multiple first RRUs that serve the terminal; or if demodulation is performed in a downlink mode without using a DRS, the BBU performs resource scheduling on the terminal by using a third RRU, where the third RRU is determined by the BBU according to any one of an uplink signal strength value, a downlink quality value, or an uplink quality value of the terminal. A problem, caused by a multi-RRU joint transmission manner used in the prior art, that a system throughput loss is severe if service volumes of multiple users are sufficient is resolved. Because in the embodiments of the present invention, after performing determining according to a downlink mode of each terminal, the BBU determines a serving RRU for the terminal, higher user performance reliability and system efficiency may be obtained, and resource utilization and a system throughput are also improved.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

For better understanding of the embodiments of the present invention, the following uses specific embodiments to provide further explanations with reference to the accompanying drawings, and the embodiments constitute no limitation on the embodiments of the present invention.

Embodiment 1

Figure 2:
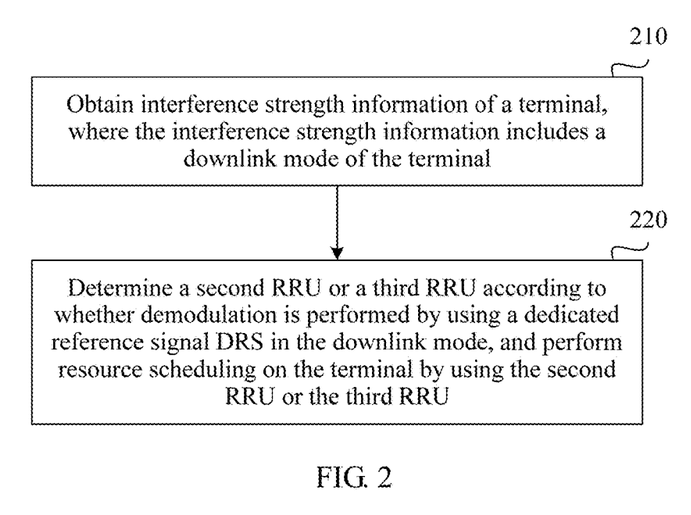
FIG. 2 is a flowchart of a method for determining remote radio unit (RRU) according to Embodiment 1 of the present invention.

The following describes, in detail by using FIG. 2 as an example, a method for determining remote radio unit (RRU) provided in Embodiment 1 of the present invention. FIG. 2 is a flowchart of the method for determining remote radio unit (RRU) according to Embodiment 1 of the present invention. In actual networking, a base station includes a baseband unit (BBU) and multiple RRUs connected to the BBU. In this embodiment of the present invention, the method is executed by the BBU in the base station or the base station. The following provides description by using an example in which the BBU executes the method. As shown in FIG. 2, this embodiment specifically includes the following steps:

Step 210: The baseband unit (BBU) obtains interference strength information of a terminal, where the interference strength information includes a downlink mode of the terminal.

Specifically, the BBU obtains the interference strength information of the terminal. Specifically, the interference strength information is obtained by measuring by the terminal, and then is sent to the BBU; or specifically, the interference strength information is obtained by measuring by the BBU.

The downlink mode of the terminal is a Transmission Mode (TM) TM 7, a TM 8, a TM 9, a TM 10, or the like.

Step 220: Determine a second RRU or a third RRU according to whether demodulation is performed by using a dedicated reference signal (DRS) in the downlink mode, and perform resource scheduling on the terminal by using the second RRU or the third RRU. For example, if demodulation is performed by using the dedicated reference signal (DRS) in the downlink mode, the BBU performs resource scheduling on the terminal by using the second RRU, where the second RRU is selected by the BBU from multiple first RRUs that serve the terminal; or if demodulation is performed without using the DRS in the downlink mode, the BBU performs resource scheduling on the terminal by using the third RRU, where the third RRU is determined by the BBU according to any one of an uplink signal strength value of the terminal, a downlink quality value of the terminal, or an uplink quality value of the terminal.

Specifically, after the BBU obtains the downlink mode, the BBU determines whether demodulation is performed by using the Dedicated Reference Signal (DRS) in the downlink mode. If demodulation is performed by using the DRS in the downlink mode, the BBU performs resource scheduling on the terminal by using the second RRU, where the second RRU is selected by the BBU from the multiple first RRUs that serve the terminal. Alternatively, if demodulation is performed without using the DRS in the downlink mode, the BBU performs resource scheduling on the terminal by using the third RRU, where the third RRU is determined by the BBU according to any one of an uplink signal strength value of the terminal, a downlink quality value of the terminal, or an uplink quality value of the terminal.

The uplink signal strength value, the downlink quality value, and the uplink quality value may be carried in the interference strength information.

As an example instead of a limitation, the uplink signal strength value includes uplink Demodulation Reference Signal (DMRS) Reference Signal Received Power (RSRP), uplink Sounding Reference Signal (SRS) RSRP, and the like. The downlink quality value includes a full-joint originally reported full-band Channel Quality Indicator (CQI) or a filtering value of the full-band CQI, or a full-joint originally reported sub-band CQI or a filtering value of the sub-band CQI, a CQI adjusted by a user and a filtering value of the CQI adjusted, spectral efficiency adjusted by a user, and the like. The uplink quality value includes an uplink DMRS SINR and an uplink SRS SINR.

Optionally, in this embodiment of the present invention, the multiple first RRUs include the second RRU and other RRU, and a signal strength value of the second RRU is greater than a signal strength value of the other RRU. That is, if demodulation is performed by using the DRS in the downlink mode, the BBU selects one RRU (a signal strength value of the RRU is optimal), from the multiple first RRUs according to signal strength values of the multiple first RRUs, as the second RRU that serves the terminal.

Optionally, if demodulation is performed without using the DRS in the downlink mode, the BBU determines whether the uplink signal strength value is less than a first threshold, or the BBU determines whether the downlink quality value is less than a second threshold, or the BBU determines whether the uplink quality value is less than a third threshold.

The first threshold is specifically a preset strength threshold, the second threshold is specifically a preset first quality threshold, and the third threshold is specifically a preset second quality threshold.

Optionally, if the uplink signal strength value is less than the strength threshold, or the downlink quality value is less than the first quality threshold, or the uplink quality value is less than the second quality threshold, the third RRU includes all RRUs controlled by the BBU, that is, the BBU determines all the RRUs controlled by the BBU, and the BBU performs resource scheduling on the terminal by using all the RRUs.

Optionally, if the uplink signal strength value is greater than or equal to the strength threshold, or the downlink quality value is greater than or equal to the first quality threshold, or the uplink quality value is greater than or equal to the second quality threshold, the third RRU includes the multiple first RRUs that serve the terminal, that is, the BBU performs resource scheduling on the terminal by using the multiple first RRUs.

Optionally, in step 210 in this embodiment of the present invention, the BBU further obtains location information of the terminal, and the BBU determines, according to the obtained location information and the obtained interference strength information, the multiple first RRUs that serve the terminal.

It can be understood that, in this embodiment of the present invention, the multiple first RRUs that serve the terminal specifically refer to RRUs that send data and a signal to the terminal or receive data and a signal sent by the terminal.

Optionally, in this embodiment of the present invention, if demodulation is performed without using the DRS in the downlink mode, the BBU performs resource scheduling on the terminal by using the third RRU, and in addition, the BBU may further perform resource scheduling on the terminal by using the multiple first RRUs. It should be noted that, in the foregoing embodiment, after obtaining the interference strength information of the terminal, the BBU first determines the downlink mode of the terminal. If demodulation is performed by using the DRS in the downlink mode, the BBU performs resource scheduling on the terminal by using one second RRU selected from the multiple first RRUs that serve the terminal; or if demodulation is performed without using the DRS in the downlink mode, the BBU performs resource scheduling on the terminal by using the multiple first RRUs that serve the terminal.

Alternatively, if demodulation is performed without using the DRS in the downlink mode, and any one of the uplink signal strength value, the downlink quality value, or the uplink quality value is less than a corresponding threshold, the BBU performs resource scheduling on the terminal by using all the controlled RRUs.

Alternatively, if demodulation is performed without using the DRS in the downlink mode, and any one of the uplink signal strength value, the downlink quality value, or the uplink quality value is greater than or equal to a corresponding threshold, the BBU performs resource scheduling on the terminal by using the multiple first RRUs that serve the terminal.

In a practical application, after obtaining the interference strength information of the terminal, the BBU may first determine any one of the uplink signal strength value, the downlink quality value, or the uplink quality value of the terminal included in the interference strength information. If any one of the uplink signal strength value, the downlink quality value, or the uplink quality value is less than a corresponding threshold, the BBU performs resource scheduling on the terminal by using all the controlled RRUs; or if any one of the uplink signal strength value, the downlink quality value, or the uplink quality value is greater than or equal to a corresponding threshold, the BBU performs resource scheduling on the terminal by using the multiple first RRUs that serve the terminal.

Alternatively, if any one of the uplink signal strength value, the downlink quality value, or the uplink quality value is greater than or equal to a corresponding threshold, and demodulation is performed by using the DRS in the downlink mode, the BBU performs resource scheduling on the terminal by using one second RRU selected from the multiple first RRUs that serve the terminal.

Alternatively, if any one of the uplink signal strength value, the downlink quality value, or the uplink quality value is greater than or equal to a corresponding threshold, and demodulation is performed without using the DRS in the downlink mode, the BBU performs resource scheduling on the terminal by using the multiple first RRUs that serve the terminal.

It can be understood that, in this embodiment of the present invention, the method for determining RRU is described by using examples, which is not limited thereto in a practical application.

Therefore, by applying the method for determining remote radio unit (RRU) provided in this embodiment of the present invention, a BBU obtains interference strength information of a terminal. If demodulation is performed, by using a dedicated reference signal (DRS), in a downlink mode of the terminal included in the interference strength information, the BBU performs resource scheduling on the terminal by using a second RRU, where the second RRU is selected by the BBU from multiple first RRUs that serve the terminal; or if demodulation is performed without using a DRS in a downlink mode, the BBU performs resource scheduling on the terminal by using a third RRU, where the third RRU is determined by the BBU according to any one of an uplink signal strength value, a downlink quality value, or an uplink quality value of the terminal. A problem, caused by a multi-RRU joint transmission manner used in the prior art, that a system throughput loss is severe if service volumes of multiple users are sufficient is resolved. Because in this embodiment of the present invention, after performing determining according to a downlink mode of each terminal, the BBU determines a serving RRU for the terminal, higher user performance reliability and system efficiency may be obtained, and resource utilization and a system throughput are also improved.

For better understanding of the embodiments of the present invention, the following uses specific embodiments to provide further explanations with reference to the accompanying drawings, and the embodiments constitute no limitation on the embodiments of the present invention.

Embodiment 2

For better understanding of the embodiments of the present invention, the following uses specific embodiments to provide further explanations with reference to the accompanying drawings, and the embodiments constitute no limitation on the embodiments of the present invention.

Figure 3:
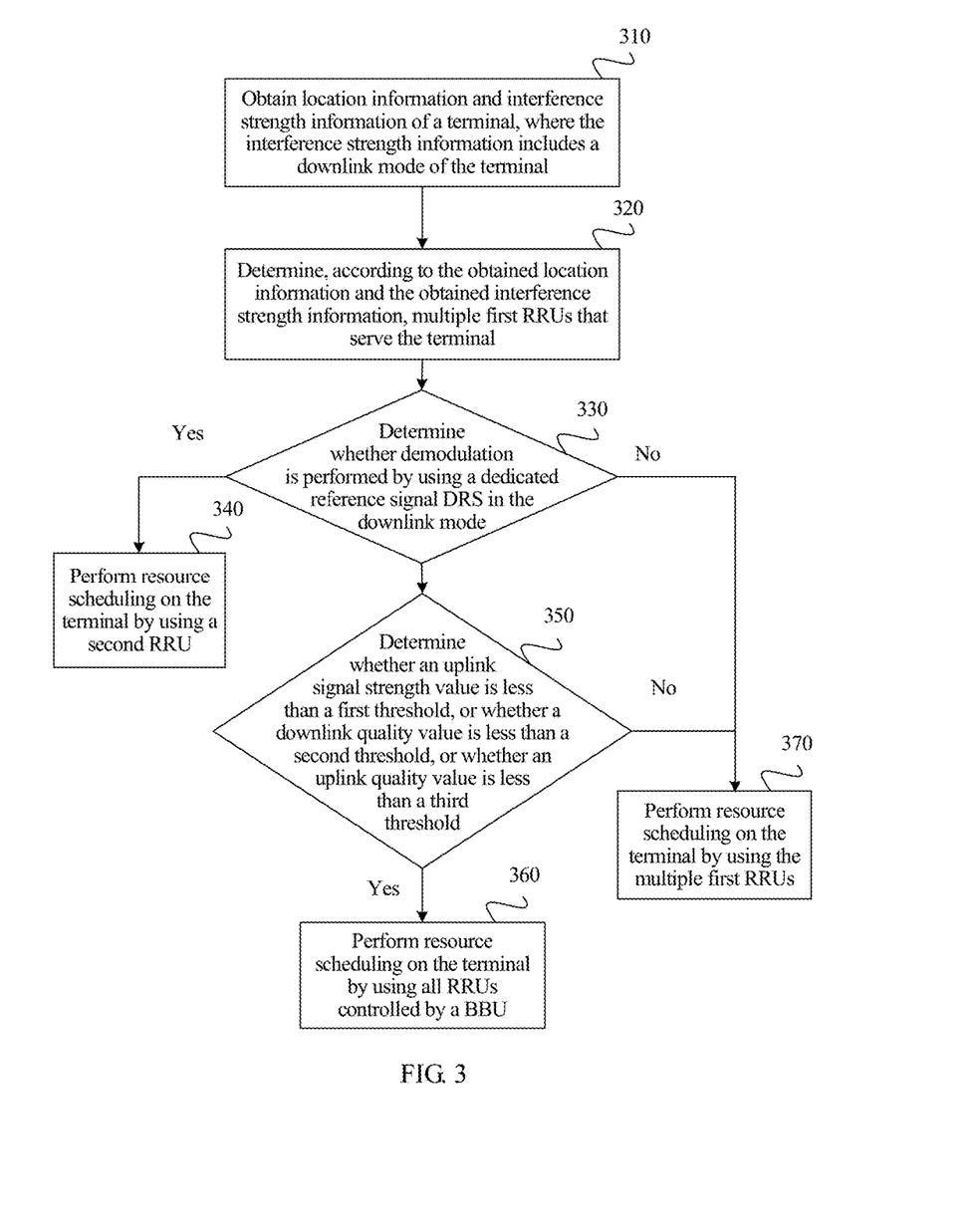
FIG. 3 is a flowchart of a method for determining remote radio unit (RRU) according to Embodiment 2 of the present invention.

The following describes, in detail by using FIG. 3 as an example, a method for determining remote radio unit (RRU) provided in Embodiment 2 of the present invention. FIG. 3 is a flowchart of the method for determining remote radio unit (RRU) according to Embodiment 2 of the present invention. In actual networking, a base station includes a BBU and multiple RRUs connected to the BBU. In this embodiment of the present invention, the method is executed by the BBU in the base station or the base station. The following provides description by using an example in which the BBU executes the method. As shown in FIG. 3, this embodiment specifically includes the following steps:

Step 310: The baseband unit (BBU) obtains location information and interference strength information of a terminal, where the interference strength information includes a downlink mode of the terminal.

Specifically, the BBU obtains the location information and the interference strength information of the terminal. Specifically, the location information and the interference strength information are obtained by measuring by the terminal, and then are sent to the BBU; or specifically, the location information and the interference strength information are obtained by measuring by the BBU.

The downlink mode of the terminal is a TM 7, a TM 8, a TM 9, a TM 10, or the like.

Step 320: The BBU determines, according to the obtained location information and the obtained interference strength information, multiple first RRUs that serve the terminal.

Specifically, the BBU determines, according to the obtained location information and the obtained interference strength information, at least one first remote radio unit that serves the terminal.

It can be understood that, in this embodiment of the present invention, the multiple first RRUs that serve the terminal specifically refer to RRUs that send data and a signal to the terminal or receive data and a signal sent by the terminal.

Step 330: The BBU determines whether demodulation is performed by using a dedicated reference signal (DRS) in the downlink mode.

Specifically, if demodulation is performed by using the DRS in the downlink mode, step 340 is performed; if demodulation is performed without using the DRS in the downlink mode, step 350 is performed.

Step 340: The BBU performs resource scheduling on the terminal by using a second RRU, where the second RRU is selected by the BBU from the multiple first RRUs that serve the terminal.

Specifically, after the BBU obtains the downlink mode, the BBU determines whether demodulation is performed by using the DRS in the downlink mode. If demodulation is performed by using the DRS in the downlink mode, the BBU performs resource scheduling on the terminal by using the second RRU, where the second RRU is selected by the BBU from the multiple first RRUs that serve the terminal.

Further, in this embodiment of the present invention, the multiple first RRUs include the second RRU and other RRU, and a signal strength value of the second RRU is greater than a signal strength value of the other RRU. That is, if demodulation is performed by using the DRS in the downlink mode, the BBU selects one RRU (a signal strength value of the RRU is optimal), from the multiple first RRUs according to signal strength values of the multiple first RRUs, as the second RRU that serves the terminal.

Step 350: The BBU determines whether an uplink signal strength value is less than a first threshold, or the BBU determines whether a downlink quality value is less than a second threshold, or the BBU determines whether an uplink quality value is less than a third threshold.

Specifically, if the uplink signal strength value is less than the first threshold, or the downlink quality value is less than the second threshold, or the uplink quality value is less than the third threshold, step 360 is performed; if the uplink signal strength value is greater than or equal to the first threshold, or the downlink quality value is greater than or equal to the second threshold, or the uplink quality value is greater than or equal to the third threshold, step 370 is performed.

In this embodiment of the present invention, the uplink signal strength value, the downlink quality value, and the uplink quality value may be carried in the interference strength information.

As an example instead of a limitation, the uplink signal strength value includes uplink DMRS RSRP, uplink SRS RSRP, and the like. The downlink quality value includes a full-joint originally reported full-band CQI or a filtering value of the full-band CQI, or a full-joint originally reported sub-band CQI or a filtering value of the sub-band CQI, a CQI adjusted by a user and a filtering value of the CQI adjusted, spectral efficiency adjusted by a user, and the like. The uplink quality value includes an uplink DMRS SINR and an uplink SRS SINR.

The first threshold is specifically a preset strength threshold, the second threshold is specifically a preset first quality threshold, and the third threshold is specifically a preset second quality threshold.

Step 360: The BBU performs resource scheduling on the terminal by using all RRUs controlled by the BBU.

Specifically, if the uplink signal strength value is less than the strength threshold, or the downlink quality value is less than the first quality threshold, or the uplink quality value is less than the second quality threshold, the BBU determines all the RRUs controlled by the BBU, and performs resource scheduling on the terminal by using all the RRUs.

Step 370: The BBU performs resource scheduling on the terminal by using the multiple first RRUs.

Specifically, if the uplink signal strength value is greater than or equal to the strength threshold, or the downlink quality value is greater than or equal to the first quality threshold, or the uplink quality value is greater than or equal to the second quality threshold, the BBU performs resource scheduling on the terminal by using the multiple first RRUs determined in step 320.

It should be noted that, in this embodiment of the present invention, when the BBU performs step 330, if demodulation is performed without using the DRS in the downlink mode, the BBU may not perform step 350 and step 360, or the BBU may directly perform step 370 when demodulation is performed without using the DRS in the downlink mode, that is, if demodulation is performed without using the DRS in the downlink mode, the BBU performs resource scheduling on the terminal by using the multiple first RRUs.

It should be noted that, in the steps of the foregoing embodiment, after obtaining the interference strength information of the terminal, the BBU first determines the downlink mode of the terminal. If demodulation is performed by using the DRS in the downlink mode, the BBU performs resource scheduling on the terminal by using one second RRU selected from the multiple first RRUs that serve the terminal; or if demodulation is performed without using the DRS in the downlink mode, the BBU performs resource scheduling on the terminal by using the multiple first RRUs that serve the terminal.

Alternatively, if demodulation is performed without using the DRS in the downlink mode, and any one of the uplink signal strength value, the downlink quality value, or the uplink quality value is less than a corresponding threshold, the BBU performs resource scheduling on the terminal by using all the RRUs controlled by the BBU.

Alternatively, if demodulation is performed without using the DRS in the downlink mode, and any one of the uplink signal strength value, the downlink quality value, or the uplink quality value is greater than or equal to a corresponding threshold, the BBU performs resource scheduling on the terminal by using the multiple first RRUs that serve the terminal.

In a practical application, after obtaining the interference strength information of the terminal, the BBU may perform step 350 first and then perform step 330. That is, the BBU determines any one of the uplink signal strength value, the downlink quality value, or the uplink quality value of the terminal included in the interference strength information. If any one of the uplink signal strength value, the downlink quality value, or the uplink quality value is less than a corresponding threshold, the BBU performs resource scheduling on the terminal by using all the RRUs controlled by the BBU; or if any one of the uplink signal strength value, the downlink quality value, or the uplink quality value is greater than or equal to a corresponding threshold, the BBU performs resource scheduling on the terminal by using the multiple first RRUs that serve the terminal.

Alternatively, if any one of the uplink signal strength value, the downlink quality value, or the uplink quality value is greater than or equal to a corresponding threshold, and demodulation is performed by using the DRS in the downlink mode, the BBU performs resource scheduling on the terminal by using one second RRU selected from the multiple first RRUs that serve the terminal.

Alternatively, if any one of the uplink signal strength value, the downlink quality value, or the uplink quality value is greater than or equal to a corresponding threshold, and demodulation is performed without using the DRS in the downlink mode, the BBU performs resource scheduling on the terminal by using the multiple first RRUs that serve the terminal.

It can be understood that, in this embodiment of the present invention, the method for determining RRU is described by using examples, which is not limited thereto in a practical application.

Embodiment 3

Figure 4:
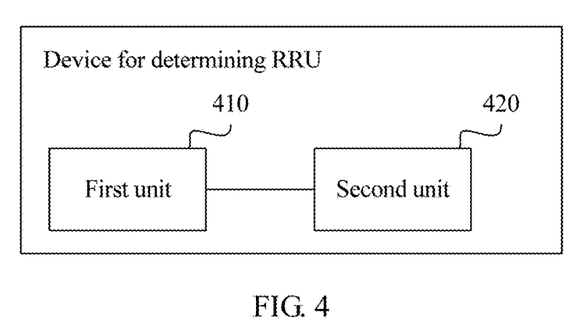
FIG. 4 is a schematic structural diagram of a device for determining remote radio unit (RRU) according to Embodiment 3 of the present invention.

Correspondingly, Embodiment 3 of the present invention further provides a device for determining remote radio unit (RRU). An implementation structure of the device is shown in FIG. 4, and the device is configured to implement the method for determining remote radio unit (RRU) in the foregoing Embodiment 1 of the present invention. The device includes the following units: a first unit 410 and a second unit 420, where the first unit 410 is configured to obtain interference strength information of a terminal, where the interference strength information includes a downlink mode of the terminal; and the second unit 420 is configured to: when demodulation is performed by using a dedicated reference signal (DRS) in the downlink mode, perform resource scheduling on the terminal by using a second RRU, where the second RRU is selected from multiple first RRUs that serve the terminal; or the second unit 420 is configured to: when demodulation is performed without using a DRS in the downlink mode, perform resource scheduling on the terminal by using a third RRU, where the third RRU is determined according to any one of an uplink signal strength value of the terminal, a downlink quality value of the terminal, or an uplink quality value of the terminal.

Optionally, the multiple first RRUs include the second RRU and other RRU, and a signal strength value of the second RRU is greater than a signal strength value of the other RRU.

Optionally, the second unit 420 is further configured to: determine a signal strength value of each first RRU of the multiple first RRUs, determine a maximum value in the signal strength values of the first RRUs, and determine a first RRU corresponding to the maximum value as the second RRU.

Optionally, if the uplink signal strength value is less than a first threshold, or the downlink quality value is less than a second threshold, or the uplink quality value is less than a third threshold, the third RRU includes all RRUs controlled by the device.

Optionally, if the uplink signal strength value is greater than or equal to a first threshold, or the downlink quality value is greater than or equal to a second threshold, or the uplink quality value is greater than or equal to a third threshold, the third RRU includes the multiple first RRUs that serve the terminal.

Optionally, the second unit 420 is further configured to:
determine whether the uplink signal strength value is less than the first threshold; or
determine whether the downlink quality value is less than the second threshold; or
determine whether the uplink quality value is less than the third threshold.

Optionally, the first unit is further configured to obtain location information of the terminal; and
the second unit 420 is further configured to determine, according to the location information and the interference strength information of the terminal, the multiple first RRUs that serve the terminal.

Optionally, the device is a baseband unit (BBU) or a base station.

Therefore, by applying the device for determining remote radio unit (RRU) provided in this embodiment of the present invention, the device obtains interference strength information of a terminal. If demodulation is performed, by using a dedicated reference signal (DRS), in a downlink mode of the terminal included in the interference strength information, the device performs resource scheduling on the terminal by using a second RRU, where the second RRU is selected by the device from multiple first RRUs that serve the terminal; or if demodulation is performed without using a DRS in a downlink mode, the device performs resource scheduling on the terminal by using a third RRU, where the third RRU is determined by the device according to any one of an uplink signal strength value, a downlink quality value, or an uplink quality value of the terminal. A problem, caused by a multi-RRU joint transmission manner used in the prior art, that a system throughput loss is severe if service volumes of multiple users are sufficient is resolved. Because in this embodiment of the present invention, after performing determining according to a downlink mode of each terminal, the device determines a serving RRU for the terminal, higher user performance reliability and system efficiency may be obtained, and resource utilization and a system throughput are also improved.

Embodiment 4

Figure 5:
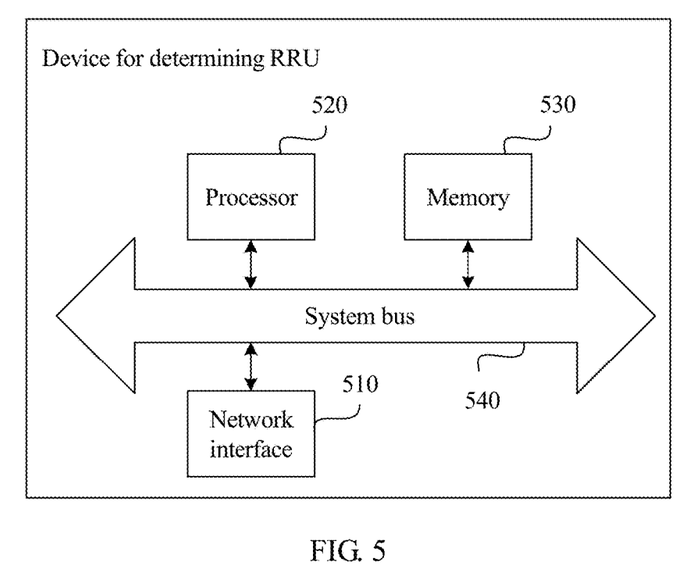
FIG. 5 is a schematic structural diagram of hardware of a device for determining remote radio unit (RRU) according to Embodiment 4 of the present invention.

In addition, the device for determining remote radio unit (RRU) provided in Embodiment 3 of the present invention may be implemented in the following manner, and is configured to implement the method for determining remote radio unit (RRU) in the foregoing Embodiment 1 and the foregoing Embodiment 2 of the present invention. As shown in FIG. 5, the device for determining remote radio unit (RRU) includes a network interface 510, a processor 520, and a memory 530. A system bus 540 is configured to connect the network interface 510, the processor 520, and the memory 530.

The network interface 510 is configured to perform interactive communication with a terminal and an RRU.

The memory 530 may be a permanent memory, such as a hard disk drive and a flash memory, and the memory 530 is configured to store an application program, where the application program includes an instruction that can be used to enable the processor 520 to access the memory and execute the following processes:

obtaining interference strength information of the terminal, where the interference strength information includes a downlink mode of the terminal; and if demodulation is performed by using a dedicated reference signal (DRS) in the downlink mode, performing resource scheduling on the terminal by using a second RRU, where the second RRU is selected from multiple first RRUs that serve the terminal; or if demodulation is performed without using a DRS in the downlink mode, performing resource scheduling on the terminal by using a third RRU, where the third RRU is determined according to any one of an uplink signal strength value of the terminal, a downlink quality value of the terminal, or an uplink quality value of the terminal.

Further, the multiple first RRUs include the second RRU and other RRU, and a signal strength value of the second RRU is greater than a signal strength value of the other RRU.

Further, the application program stored in the memory 530 further includes an instruction that can be used to enable the processor 520 to execute the following processes:

determining a signal strength value of each first RRU of the multiple first RRUs, determining a maximum value in the signal strength values of the first RRUs, and determining a first RRU corresponding to the maximum value as the second RRU.

Further, if the uplink signal strength value is less than a first threshold, or the downlink quality value is less than a second threshold, or the uplink quality value is less than a third threshold, the third RRU includes all RRUs controlled by the device.

Further, if the uplink signal strength value is greater than or equal to a first threshold, or the downlink quality value is greater than or equal to a second threshold, or the uplink quality value is greater than or equal to a third threshold, the third RRU includes the multiple first RRUs that serve the terminal.

Further, the application program stored in the memory 530 further includes an instruction that can be used to enable the processor 520 to execute the following process:

determining whether the uplink signal strength value is less than the first threshold; or
determining whether the downlink quality value is less than the second threshold; or
determining whether the uplink quality value is less than the third threshold.

Further, the application program stored in the memory 530 further includes an instruction that can be used to enable the processor 520 to execute the following processes:

obtaining location information of the terminal, and determining, according to the location information and the interference strength information of the terminal, the multiple first RRUs that serve the terminal.

Further, the device is a baseband unit (BBU) or a base station.

Therefore, by applying the device for determining remote radio unit (RRU) provided in this embodiment of the present invention, the device obtains interference strength information of a terminal. If demodulation is performed, by using a dedicated reference signal (DRS), in a downlink mode of the terminal included in the interference strength information, the device performs resource scheduling on the terminal by using a second RRU, where the second RRU is selected by the device from multiple first RRUs that serve the terminal; or if demodulation is performed without using a DRS in a downlink mode, the device performs resource scheduling on the terminal by using a third RRU, where the third RRU is determined by the device according to any one of an uplink signal strength value, a downlink quality value, or an uplink quality value of the terminal. A problem, caused by a multi-RRU joint transmission manner used in the prior art, that a system throughput loss is severe if service volumes of multiple users are sufficient is resolved. Because in this embodiment of the present invention, after performing determining according to a downlink mode of each terminal, the device determines a serving RRU for the terminal, higher user performance reliability and system efficiency may be obtained, and resource utilization and a system throughput are also improved.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for determining a remote radio unit (RRU), the method comprising:

obtaining, by a baseband unit (BBU), interference strength information of a terminal, wherein the interference strength information comprises a downlink mode of the terminal;

determining, by the BBU, whether demodulation is preformed using a dedicated reference signal (DRS) in the downlink mode;

when demodulation is performed using a DRS in the downlink mode, performing, by the BBU, resource scheduling on the terminal using a second RRU, wherein the second RRU is selected by the BBU from multiple first RRUs that serve the terminal; and when demodulation is performed without using a DRS in the downlink mode, performing, by the BBU, resource scheduling on the terminal using a third RRU, wherein the third RRU is determined by the BBU according to any one of an uplink signal strength value of the terminal, a downlink quality value of the terminal, or an uplink quality value of the terminal.

2. The method according to claim 1, wherein the second RRU is a RRU which has an optimal signal strength value among the multiple first RRUs.

3. The method according to claim 1, wherein:
when the uplink signal strength value is less than a first threshold, or the downlink quality value is less than a second threshold, or the uplink quality value is less than a third threshold, the third RRU comprises all RRUs controlled by the BBU.

4. The method according to claim 1, wherein:
when the uplink signal strength value is greater than or equal to a first threshold, or the downlink quality value is greater than or equal to a second threshold, or the uplink quality value is greater than or equal to a third threshold, the third RRU comprises the multiple first RRUs that serve the terminal.

5. The method according to claim 3, further comprising:
determining, by the BBU, whether the uplink signal strength value is less than the first threshold; or
determining, by the BBU, whether the downlink quality value is less than the second threshold; or
determining, by the BBU, whether the uplink quality value is less than the third threshold.

6. The method according to claim 1, further comprising:
obtaining, by the BBU, location information of the terminal, and determining, according to the location information and the interference strength information of the terminal, the multiple first RRUs that serve the terminal.

7. A device for determining remote radio unit (RRU), the device comprising:
a processor configured to:
obtain interference strength information of a terminal, wherein the interference strength information comprises a downlink mode of the terminal;
determine whether demodulation is performed using a dedicated reference signal (DRS) in the downlink mode;
when demodulation is performed using a DRS in the downlink mode, perform resource scheduling on the terminal using a second RRU, wherein the second RRU is selected from multiple first RRUs that serve the terminal; and
when demodulation is performed without using a DRS in the downlink mode, perform resource scheduling on the terminal using a third RRU, wherein the third RRU is determined according to any one of an uplink signal strength value of the terminal, a downlink quality value of the terminal, or an uplink quality value of the terminal.

8. The device according to claim 7, wherein the second RRU is a RRU which has an optimal signal strength value among the multiple first RRUs.

9. The device according to claim 8, wherein the processor is further configured to:
    determine a signal strength value of each first RRU of the multiple first RRUs;
    determine a maximum value in the signal strength values of the first RRUs; and
    determine a first RRU corresponding to the maximum value as the second RRU.

10. The device according to claim 7, wherein:
    when the uplink signal strength value is less than a first threshold, or the downlink quality value is less than a second threshold, or the uplink quality value is less than a third threshold, the third RRU comprises all RRUs controlled by the device.

11. The device according to claim 7, wherein:
    when the uplink signal strength value is greater than or equal to a first threshold, or the downlink quality value is greater than or equal to a second threshold, or the uplink quality value is greater than or equal to a third threshold, the third RRU comprises the multiple first RRUs that serve the terminal.

12. The device according to claim 10, wherein the processor is further configured to:
    determine whether the uplink signal strength value is less than the first threshold; or
    determine whether the downlink quality value is less than the second threshold; or
    determine whether the uplink quality value is less than the third threshold.

13. The device according to claim 7, wherein the processor is further configured to:
    obtain location information of the terminal; and
    determine, according to the location information and the interference strength information of the terminal, the multiple first RRUs that serve the terminal.

14. The device according to claim 7, wherein the device is a baseband unit (BBU) or a base station.

* * * * *